(12) United States Patent
Deuse et al.

(10) Patent No.: US 12,545,874 B2
(45) Date of Patent: Feb. 10, 2026

(54) SHORTFALL QUANTITY LIQUID CONTAINER

(71) Applicant: Sartorius Stedim Biotech GmbH, Goettingen (DE)

(72) Inventors: Mario Deuse, Bovenden (DE); Bastian Deubener, Kassel (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 860 days.

(21) Appl. No.: 17/600,938

(22) PCT Filed: Apr. 9, 2020

(86) PCT No.: PCT/EP2020/060198
§ 371 (c)(1),
(2) Date: Oct. 1, 2021

(87) PCT Pub. No.: WO2020/208160
PCT Pub. Date: Oct. 15, 2020

(65) Prior Publication Data
US 2022/0195362 A1  Jun. 23, 2022

(30) Foreign Application Priority Data
Apr. 10, 2019 (DE) .................. 10 2019 109 493.3

(51) Int. Cl.
*C12M 1/12* (2006.01)
*A61M 5/24* (2006.01)
(Continued)

(52) U.S. Cl.
CPC .......... *C12M 23/06* (2013.01); *A61M 5/2425* (2013.01); *A61M 5/282* (2013.01);
(Continued)

(58) Field of Classification Search
None
See application file for complete search history.

(56) References Cited

U.S. PATENT DOCUMENTS 4,411,656 A  10/1983 Cornett
6,319,235 B1 * 11/2001 Yoshino ........... A61B 5/150519
604/212
(Continued)

FOREIGN PATENT DOCUMENTS

CH    468196    2/1969
CN    1860218   11/2006
(Continued)

OTHER PUBLICATIONS

"German Search Report," for German Patent Application No. 102019109493.3 mailed Dec. 17, 2019 (7 pages).
(Continued)

*Primary Examiner* — Henry H Nguyen
(74) *Attorney, Agent, or Firm* — Pauly, DeVries Smith & Deffner LLC

(57) ABSTRACT

A small-volume liquid container for dispensing a liquid medium, especially biological medium, into a bioprocessing system, especially into a bioreactor, wherein the liquid container provides an accommodation volume for the liquid medium, wherein the liquid container comprises two dimensionally stable container parts, which are movable relative to one another between an initial position and an end position, and an outlet connection for discharge of the liquid medium. It is proposed that the liquid container comprises a shape-changeable delimitation means which at least sectionally delimits the accommodation volume and which is connected to the dimensionally stable container parts in such a way that a relative movement of the dimensionally stable container parts to one another, causing a change in volume of the (Continued)

accommodation volume, is associated with a change in shape of the delimitation means.

13 Claims, 6 Drawing Sheets

(51) Int. Cl.
- *A61M 5/28* (2006.01)
- *B65D 83/00* (2006.01)
- *C12M 1/00* (2006.01)
- *C12M 1/26* (2006.01)
- *C12M 1/42* (2006.01)

(52) U.S. Cl.
CPC ......... *B65D 83/7713* (2025.01); *C12M 23/26* (2013.01); *C12M 23/28* (2013.01); *C12M 23/34* (2013.01); *C12M 33/04* (2013.01); *C12M 35/04* (2013.01); *C12M 37/04* (2013.01)

(56) References Cited

U.S. PATENT DOCUMENTS

| | | | |
|---|---|---|---|
| 9,550,025 | B2 | 1/2017 | Dunne |
| 12,065,687 | B2 | 8/2024 | Idelevich et al. |
| 2003/0035744 | A1 | 2/2003 | Horita et al. |
| 2004/0035743 | A1* | 2/2004 | Tighe ............... A61M 5/1456 604/181 |
| 2008/0045857 | A1 | 2/2008 | Miller et al. |
| 2010/0137811 | A1 | 6/2010 | Yuge et al. |
| 2011/0087173 | A1 | 4/2011 | Sibbitt et al. |
| 2011/0196379 | A1* | 8/2011 | Blakemore ........ A61B 17/8811 606/93 |
| 2011/0282197 | A1* | 11/2011 | Martz ................. A61J 1/10 600/432 |
| 2013/0281940 | A1* | 10/2013 | Gelblum ............ A61M 5/2425 604/216 |
| 2021/0102876 | A1* | 4/2021 | Fruchter ............. G01N 1/4077 |
| 2022/0195362 | A1 | 6/2022 | Deuse et al. |

FOREIGN PATENT DOCUMENTS

| | | | |
|---|---|---|---|
| CN | 203123203 | 8/2013 | |
| CN | 204352310 | 5/2015 | |
| CN | 208552832 | 3/2019 | |
| DE | 2638200 | 3/1978 | |
| DE | 4340082 | 6/1995 | |
| EP | 0094101 | 11/1983 | |
| EP | 0170784 | 2/1986 | |
| EP | 1679365 | 7/2006 | |
| JP | S60261464 | 12/1985 | |
| JP | 2004018504 | 1/2004 | |
| JP | 2016049313 | 4/2016 | |
| JP | 2017127283 | 7/2017 | |
| KR | 20190019572 | 2/2019 | |
| WO | 8902286 | 3/1989 | |
| WO | WO-9714027 A2 * | 4/1997 | ............ G01N 30/16 |
| WO | 2004018320 | 3/2004 | |
| WO | 2005016534 | 2/2005 | |
| WO | 2007113244 | 10/2007 | |
| WO | 2020208160 | 10/2020 | |

OTHER PUBLICATIONS

"International Search Report and Written Opinion," for PCT Application No. PCT/EP2020/060198 mailed Jun. 29, 2020 (14 pages).

"International Standard ISO 14644-1," Cleanrooms and associated controlled environments, Second Edition, Dec. 15, 2015 (44 pages).

"First Office Action," for Chinese Patent Application No. 202080027343.0 mailed Apr. 30, 2024 (19 pages) with English translation.

"International Preliminary Report on Patentability," for PCT Application No. PCT/EP2020/060198 mailed Sep. 28, 2021 (7 pages).

"Examination Report for," Canadian Application No. 3,135,467, mailed May 13, 2025, 3 pages.

"Request for the Submission of an Opinion," for Korean Application No. 10-2021-7036583, mailed May 2, 2025, with English translation, 26 pages.

* cited by examiner

SHORTFALL QUANTITY LIQUID CONTAINER

CROSS-REFERENCE TO RELATED APPLICATIONS

This application is a national stage application under 35 U.S.C. 371 of International Patent Application Serial No. PCT/EP2020/060198, entitled "Shortfall Quantity Liquid Container," filed Apr. 9, 2020, which claims priority from German Patent Application No. DE 10 2019 109 493.3, filed Apr. 10, 2019, the disclosure of which is incorporated herein by reference.

FIELD OF THE TECHNOLOGY

Various embodiments relate to a small-volume liquid container for dispensing a liquid medium into a bioprocessing system, especially into a bioreactor, to a packaging arrangement comprising a package and such a liquid container sterile-packed therein and to the use of such a sterile-packed liquid container and/or such a packaging arrangement.

BACKGROUND

A bioprocessing system is understood here quite generally to mean an installation with which biotechnological processes can be carried out or supported. Merely by way of example, this includes bioreactors, in which microorganisms or tissue cells are cultivated under specified conditions. Such an installation usually comprises a container in which a biological reaction medium composed of the materials intended for a biotechnological process, for example microorganisms or tissue cells on the one hand and an appropriate growth medium on the other, is accommodated in order to be able to carry out the particular biotechnological process step, for example fermentation or cultivation.

One example of such a bioreactor is a production bioreactor, i.e., a relatively large bioreactor on a production scale with a working volume of, for example, several 100 or several 1000 liters, for industrial production of microbial or cellular products, especially biopharmaceuticals. The product formed by such a bioreactor is a fermentation broth, which is usually further treated in a so-called downstream process in order to obtain a product from the cells or the culture supernatant. Another example is a laboratory bioreactor, i.e., a relatively small bioreactor on a laboratory scale with a working volume of, for example, less than 10 liters. Such a laboratory bioreactor is used, for example, for producing ATMPs (advanced therapy medical products) and/or for carrying out cell expansion, which makes it possible to generate a sufficient number of cells, especially tissue cells or microbial cells, for the particular intended application. One application therefor is the multiplication of human cells, for example T cells (T lymphocytes), which are taken from the patient, subsequently expanded ex vivo and then reinfused into the patient.

Specifically in the case of the production of ATMPs using a laboratory bioreactor, but in principle also in the case of a production bioreactor, very exact and precise addition of the individual liquid media, for example biological media, into the particular bioreactor is important. Since many ATMPs cannot be sterile-filtered or undergo final sterilization, such pharmaceuticals are produced sterilely in cleanrooms of appropriate cleanroom grades. The addition of a liquid medium into a bioreactor or the transfer of a liquid medium between two culture vessels and/or bioreactors fundamentally entails the risk of contamination, and it is for this reason that such handling steps are usually carried out in a cleanroom of cleanroom grade A (GMP Guidelines, Annex 1) or ISO 5 (ISO 14644-1). However, the production of pharmaceuticals in such cleanrooms is very cost-intensive due to high monitoring requirements, complex clothing procedures, etc.

For this reason, there is a demand for closed systems for cultivation or expansion of cells, especially in the field of the production of ATMPs, whereby cleanrooms of lower cleanroom grades can be used, for example cleanrooms of cleanroom grade D (GMP Guidelines, Annex 1) or ISO 8 (ISO 14644-1). However, it is a challenge to add a liquid medium to such a closed system in a very simple manner. Different small-volume liquid containers, i.e., liquid containers with a low accommodation volume of, for example, not more than 30 ml such as syringes or vials, are known. However, the transfer of the liquid medium from such a liquid container into the closed system sometimes requires the multiple use of sterile connectors, sterile filters or the like, and this in turn increases effort and costs.

SUMMARY

It is an object of various embodiments to design and develop a small-volume liquid container in such a way that the addition of a liquid medium into a closed system is simplified for the end user.

For a small-volume liquid container for dispensing a liquid medium, especially biological medium the above object is achieved by the features described herein.

What is essential is the fundamental consideration of providing a small-volume liquid container that makes it possible to transfer an exact quantity of a liquid medium, especially biological medium, into a bioprocessing system, especially into a bioreactor, without the need at the same time for the user to fill the liquid container in a cleanroom and/or with use of sterile connectors, sterile filters or the like. This is achieved by designing the proposed liquid container in such a way that it can already be filled in a simple manner by the manufacturer with the liquid medium to be added in order to then make the prefilled liquid container available to the end user for the particular biotechnological process, for example the production of an ATMP. For this purpose, the proposed liquid container comprises, in addition to two dimensionally stable container parts which through a relative movement to one another allow the medium to be pushed out of the accommodation volume, an element which delimits the accommodation volume for the medium and which changes its shape through the relative movement of the container parts. This element, referred to below as a shape-changeable delimitation means, can form a flexible vessel which can be sterile-filled by the manufacturer in a simple manner with the exactly required quantity of liquid medium and which can then be emptied in a simple manner by the user through a relative movement of the two dimensionally stable container parts.

The filling by the manufacturer that is made possible by the proposed solution has, first of all, the advantage that it is possible here to produce very large numbers of units in an automated manner under industrial conditions, thereby considerably reducing the risk of contamination compared to manual filling. In addition, particularly precise filling of the liquid containers with the exactly prescribed quantity of liquid medium can be thus achieved, with an always constant quantity being ensured even in the case of large numbers of units. Lastly, the large numbers of units mean that filling effort is also correspondingly low compared to manual filling. Therefore, there are already considerable advantages solely with the filling of the particular accommodation volume.

But the addition of the liquid medium from the liquid container into the closed system has been distinctly optimized, too. Firstly, as already mentioned, it is ensured that the particular liquid container always contains the exactly prescribed quantity of liquid medium. Secondly, it is guaranteed that, if multiple liquid containers are used in the course of a biotechnological process, they all contain exactly the same fill quantity. Lastly, a particularly high degree of sterility is also ensured, since the accommodation volume has been filled under sterile conditions and, in embodiments of the dimensionally stable container parts also being provided by the manufacturer, they are likewise available sterile to the end user. Thus, the proposed liquid container can be made available to the end user sterile-packed as a unit which can be already exactly filled with the liquid medium. Since the unit can be made available to the user already filled and sterile, the user only needs to ensure a sterile connection when transferring the liquid medium from the liquid container into the closed system.

Irrespective of the advantages mentioned above, the proposed shape-changeable delimitation means also makes subsequent disposal less complicated. For instance, certain biological media can fundamentally pose a hazard to humans and the environment. In order to avoid this, what is possible in this case, for the proposed liquid container, is separation of the delimitation means from the dimensionally stable container parts in a simple manner and separate disposal, for example incineration, thereof. The dimensionally stable container parts, which have not come into contact with the biological medium, can then be reused after sterilization or some other inactivation technique.

Specifically, what is now proposed is that the liquid container comprises a shape-changeable delimitation means which at least sectionally delimits the accommodation volume and which is connected to the dimensionally stable container parts in such a way that a relative movement of the dimensionally stable container parts to one another, causing a change in volume of the accommodation volume, is associated with a change in shape of the delimitation means. What is meant here by a change in shape is that at least two sections of the delimitation means, which each delimit the accommodation volume, change their position relative to one another, in particular are moved toward one another, as a result of the relative movement of the two dimensionally stable container parts. In the course of the change in shape, the two sections of the delimitation means changing their position can be folded toward one another, or, if they have already previously been arranged in the form of folding, such as in the case of a concertina bellows for example, the medium-filled space between the sections of the delimitation means can be made smaller in the course of the change in shape. The change in shape is thus especially associated with no or at least no appreciable elastic deformation of the material of the delimitation means.

According to various embodiments, the delimitation means at least substantially delimits the accommodation volume by itself. Here, "substantially" means that the delimitation means can be provided with an opening, especially an outlet opening, which can be closed by an additional element, for example an extension such as a piece of tubing or a tube, until the moment of dispensing of the liquid medium, and so in this case the additional element likewise forms part of the delimitation means of the accommodation volume. In principle, it is, however, also conceivable that the delimitation means completely delimits the accommodation volume and, at least to begin with, does not have an opening; instead, an outlet opening is only formed in the course of the dispensing of the liquid medium, for example at a predetermined breaking point.

Various embodiments of the delimitation means are disclosed, in particular when it at least substantially delimits the accommodation volume by itself.

Various embodiments provide possibilities of the arrangement of the delimitation means relative to the dimensionally stable container parts.

Various embodiments relate to the interaction and design of the dimensionally stable container parts.

Various embodiments of the liquid container that allow the dispensing of the liquid medium and, optionally, filling with the liquid medium are provided. Thus, the delimitation means and/or a dimensionally stable container part can form the outlet connection and, optionally, also a filling connection.

According to some embodiments, the accommodation volume of the proposed liquid container is already filled with a liquid medium, in particular by the manufacturer.

Various embodiments provide a projection on one or both dimensionally stable container parts that, in the end position of the dimensionally stable container parts, projects into the space which is laterally delimited by the material of the delimitation means. Said space, also called dead space, unavoidably remains in the end position because the material of the delimitation means, for example the folded-up layers of a concertina bellows, takes up a certain volume in the end position and cannot be compressed completely flat. So that as little liquid medium as possible remains in this remaining space, the projection penetrates into the remaining space during the relative movement of the dimensionally stable container parts to one another that causes the change in volume of the accommodation volume and said projection displaces the liquid medium situated therein at least to a great extent and substantially completely.

According to various embodiments, a packaging arrangement comprising a package and a proposed liquid container sterile-packed therein is provided as such. In view of the fact that the proposed packaging arrangement comprises a proposed liquid container, reference may be made to all relevant statements concerning the first-mentioned teaching.

According to various embodiments, the use of a proposed sterile-packed liquid container and/or a proposed packaging arrangement for the addition of a liquid medium, especially biological medium, into a bioprocessing system, especially into a bioreactor, is provided. In view of the fact that the proposed use relates to the use of a proposed liquid container and/or a proposed packaging arrangement, reference may be made to all relevant statements concerning the first-mentioned and the second-mentioned teaching.

What has been identified with the proposed packaging arrangement and the proposed use is that the proposed liquid container makes it possible to supply a liquid medium to a closed system, especially a bioreactor, in a particularly simple manner without any appreciable risk of contamination by being already made available in a sterile state to the end user. In some embodiments, the proposed liquid container is also already filled in this state, as already explained.

In various embodiments, individual components or all the components of the proposed liquid container can be designed as single-use components, the components can be made of a plastics material.

Various embodiments provide a small-volume liquid container for dispensing a liquid medium, especially biological medium, into a bioprocessing system, especially into a bioreactor, wherein the liquid container provides an accommodation volume for the liquid medium, wherein the liquid container comprises two dimensionally stable container parts, which are movable relative to one another between an initial position and an end position, and an outlet connection for discharge of the liquid medium, wherein the liquid container comprises a shape-changeable delimitation means which at least sectionally delimits the accommodation volume and which is connected to the dimensionally stable container parts in such a way that a relative movement of the dimensionally stable container parts to one another, causing a change in volume of the accommodation volume, is associated with a change in shape of the delimitation means.

In various embodiments, the delimitation means substantially completely delimits the accommodation volume by itself or in that the delimitation means at least substantially delimits the accommodation volume together with at least one of the dimensionally stable container parts, such as with both dimensionally stable container parts.

In various embodiments, the delimitation means is a bellows, such as concertina bellows, a tube or a membrane.

In various embodiments, the delimitation means is arranged or arrangeable between the dimensionally stable container parts.

In various embodiments, the delimitation means is inserted in at least one of the dimensionally stable container parts and/or between both dimensionally stable container parts in a detachable manner, especially in a form-fitting manner, or in that the delimitation means is connected to at least one of the dimensionally stable container parts, such as to both dimensionally stable container parts, in a permanent manner, especially in a cohesive manner.

In various embodiments, the dimensionally stable container parts are movable toward one another in a linear manner, wherein the dimensionally stable container parts can form a cylinder-piston arrangement.

In various embodiments, the dimensionally stable container parts are pivotable relative to one another, wherein at least one of the dimensionally stable container parts or both dimensionally stable container parts, are plate-shaped or pan-shaped.

In various embodiments, in the end position, one dimensionally stable container part is held in a form-fitting manner, such as latched, on the other dimensionally stable container part in the direction of the initial position.

In various embodiments, the outlet connection is formed on the delimitation means and/or on one of the dimensionally stable container parts, wherein a filling connection for filling of the accommodation volume with the liquid medium can be provided on the delimitation means and/or on the dimensionally stable container part.

In various embodiments, a piece of tubing or tube is coupled to the outlet connection and/or a piece of tubing or tube is coupled to the filling connection, wherein the end of the piece of tubing or tube that is pointing away from the liquid container is sealed, especially heat-sealed.

In various embodiments, the accommodation volume is filled with a liquid medium, wherein at the amount of the liquid medium in the accommodation volume is up to 50 ml, up to 40 ml, up to 30 ml, up to 20 ml, up to 10 ml or up to 5 ml.

In various embodiments, one of the dimensionally stable container parts or both dimensionally stable container parts have in each case a projection which, in the end position after the relative movement of the dimensionally stable container parts to one another that causes the change in volume of the accommodation volume, projects into the space which is laterally delimited by the material of the delimitation means.

Various embodiments provide a packaging arrangement comprising a package and a liquid container as disclosed sterile-packed therein and/or a delimitation means of a liquid container as disclosed sterile-packed therein.

Various embodiments provide the use of a sterile-packed liquid container as described herein and/or a packaging arrangement as described herein for the addition of a liquid medium, especially biological medium, into a bioprocessing system, especially into a bioreactor.

In various embodiments, at least the delimitation means, and in some embodiments also at least one of the dimensionally stable container parts, especially both dimensionally stable container parts, and/or the piece(s) of tubing or tube(s), especially as a single-use component, is/are at least partially, or at least predominantly, made of a plastics material, such as of a silicone material and/or of a polymer material, especially PE, PP, PTFE, PBT, PSU, PESU, PC.

BRIEF DESCRIPTION OF THE DRAWINGS

Various aspects will be explained in more detail below with reference to a drawing illustrating merely exemplary embodiments. In the drawing

DETAILED DESCRIPTION

The proposed small-volume liquid container 1 depicted in FIGS. 1 to 6 in various exemplary embodiments serves for dispensing a liquid medium, in this case biological medium, said medium having undergone prefilling by the manufacturer, into a bioprocessing system, especially a bioreactor, which forms a closed system or is integrated into a closed system. The bioreactor, which is not depicted here for the sake of clarity, is for example designed as a laboratory bioreactor, i.e., as a bioreactor which, in contrast to a production bioreactor, has a relatively small working volume (maximum available filling volume) of not more than 10 liters. Such a bioreactor is used to carry out a biotechnological process which, here, serves for producing an advanced therapy medical product (ATMP). The biotechnological process can, for example, also be a cell expansion process for T cells. In any case, what is provided in the bioreactor is a biological reaction medium which, in particular, comprises tissue cells or microbial cells and a growth medium. Here, it is necessary to add the liquid media to the closed system sterilely and in an exactly metered quantity.

Figure 1:
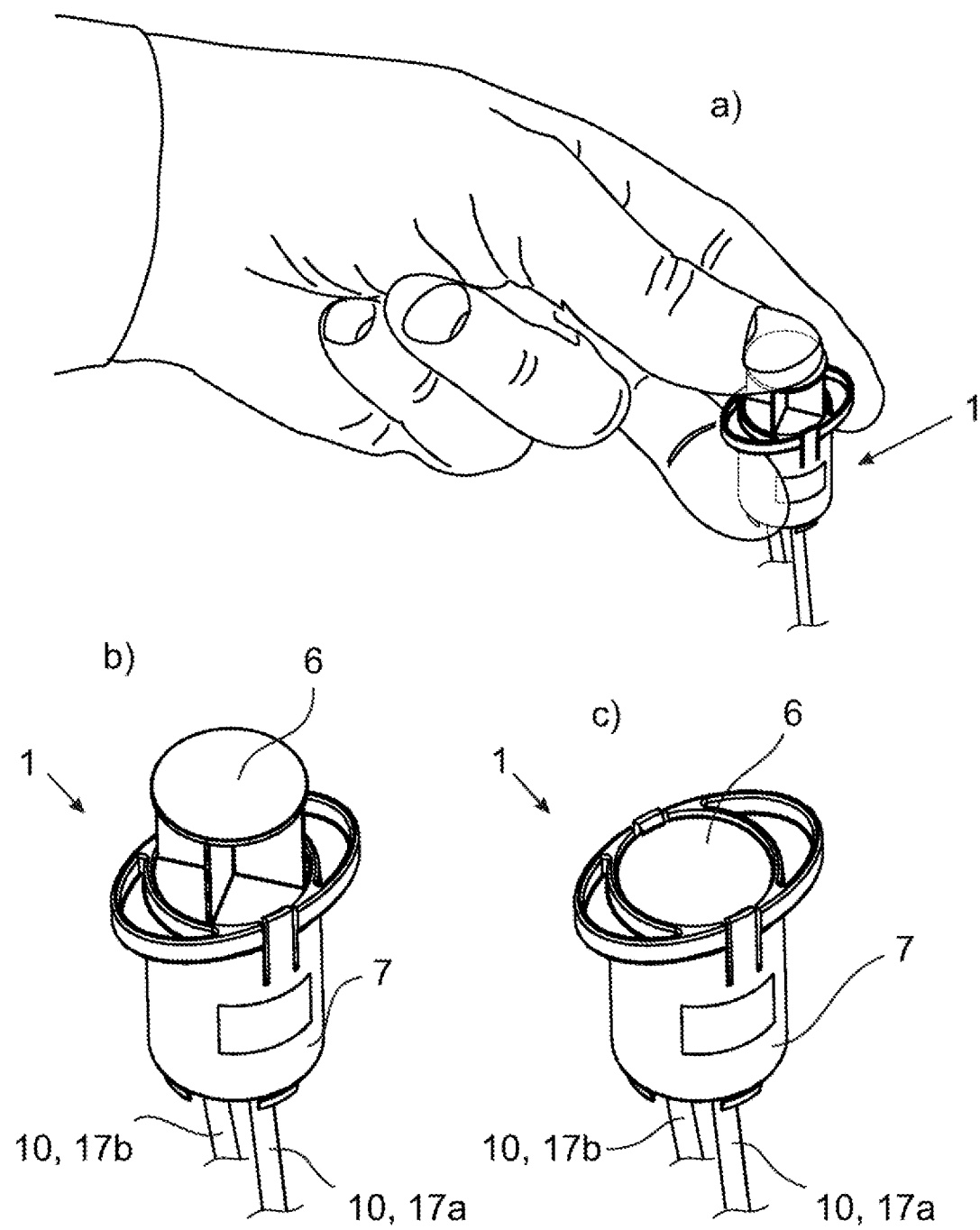
FIG. 1 shows a perspective view of a proposed small-volume liquid container a) during use, b) before use and c) after use.
Figure 2:
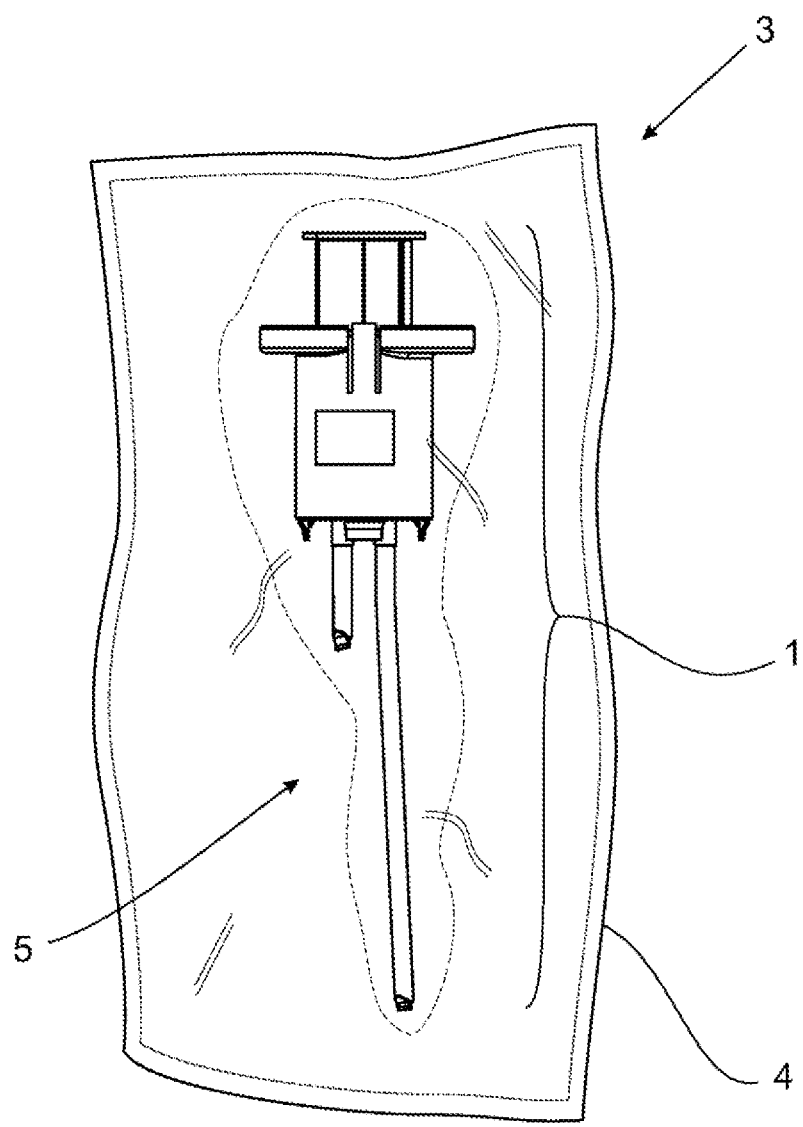
FIG. 2 shows a side view of a proposed sterile-packed liquid container according to FIG. 1.

The proposed liquid container 1 is intended specifically for this purpose. It provides an accommodation volume 2 for the liquid medium. Said liquid medium has already been filled by the manufacturer into the accommodation volume 2 in the prescribed quantity under sterile conditions, followed by sterile-packing of the liquid container 1 which in addition is also sterile. In this sterile-packed, prefilled state, the proposed liquid container 1 is then made available to the end user. As an example of this, FIG. 2 shows a packaging arrangement 3 comprising a package 4 and a proposed liquid container 1 sterile-packed therein. As can be seen in FIG. 2, the liquid container 1 is already completely preassembled and is, here, designed as a single-use unit 5, i.e., as a unit 5 in which all the components are single-use components (disposable components). The risk of cross-contamination is considerably reduced when the single-use unit 5 is appropriately exchanged.

Furthermore, as illustrated by FIGS. 3 to 6 in particular, the proposed liquid container 1 comprises two dimensionally stable container parts 6, 7, which are movable relative to one another between an initial position and an end position, and an outlet connection 8 for discharge of the liquid medium. As shown by inter alia FIGS. 4a), 5b) and 6b), the initial position means the position in which the accommodation volume 2 is of its maximum size or in which the accommodation volume 2 has been filled with the fill quantity of liquid medium that has been prescribed for dispensing into the bioprocessing system. As shown by inter alia FIGS. 4b), 5c) and 6c), the end position accordingly means the position in which the accommodation volume 2 is of its minimum size or in which the prescribed quantity of liquid medium has been discharged from the accommodation volume 2.

What is essential then is that the proposed liquid container 1 comprises a shape-changeable delimitation means 9 which at least sectionally delimits the accommodation volume 2 and which is connected to the dimensionally stable container parts 6, 7 in such a way that a relative movement of the dimensionally stable container parts 6, 7 to one another, causing a change in volume of the accommodation volume 2, is associated with a change in shape of the delimitation means 9.

Thus, as respectively shown by a combined look at FIGS. 4a) and b), a combined look at FIGS. 5b) and c) or a combined look at FIGS. 6b) and c), the shape of the delimitation means 9 is changed by displacing the container part 6 relative to the container part 7, in this case by manual application of force, the result being that the container part 6 is, here, moved in the direction of the container part 7. The associated change in shape of the delimitation means 9 directly results in a change, namely a reduction in this case, in the size of the accommodation volume 2. As a result, the liquid medium is discharged from the accommodation volume 2 and thus from the proposed liquid container 1 via the outlet connection 8. Since the proposed liquid container 1 has already been filled with the prescribed quantity of liquid medium and sterile-packed by the manufacturer, the addition of the liquid medium into the bioprocessing system, in this case the bioreactor, is highly precise. In addition, the risk of contamination of the liquid medium is considerably reduced, since there is no need for the end user to fill the small-volume liquid container 1 on-site himself. It is only when transferring the liquid medium from the liquid container 1 into the closed system that the end user additionally needs to provide a sterile connection. Such a sterile connection can, for example, be established by means of a sterile connector which couples the liquid container 1, or a piece of tubing on the container side that will be described in more detail below, to the bioprocessing system, or a piece of tubing on the system side, in a sterile and fluidic manner. Alternatively, such a piece of tubing on the container side that is initially sealed can be fluidically coupled to a corresponding and likewise initially sealed piece of tubing on the system side or reactor side in a sterile welding process.

Here, the delimitation means 9 at least substantially delimits the accommodation volume 2 by itself. Here, only an extension 10, which is coupled to the liquid container 1 and/or the delimitation means 9 via the outlet connection 8 and which will be described in more detail below, is likewise part of the delimitation of the accommodation volume 2. Here, the accommodation volume 2 thus extends within the delimitation means 9 and within the extension 10. In an alternative embodiment, which is not depicted here, it is, however, also conceivable in principle that the accommodation volume 2 is at least substantially completely delimited by the delimitation means 9 together with one or both container parts 6, 7. However, it can be when the delimitation means 9 completely or at least substantially completely forms the accommodation volume 2, since the delimitation means 9 can in this way be filled and disposed of independently of the dimensionally stable container parts 6, 7. In this way, the container parts 6, 7 can be brought together with the delimitation means 9 after it has been filled, the delimitation means 9 can be arranged between the container parts 6, 7. After the liquid medium has been dispensed, the delimitation means 9 can then optionally also be separated from the container parts 6, 7, the container parts 6, 7 being reusable after the delimitation means 9 has been disposed of.

In case of the exemplary embodiment in FIGS. 1 to 4, the delimitation means 9 is a bellows 11, here a concertina bellows. Here, said relative movement between the container parts 6, 7 compresses the bellows 11 or concertina bellows in the direction of the outlet connection 8, in particular compresses it according to the principle of an accordion, and the liquid medium exits via the outlet connection 8 as a result.

As schematically shown by FIG. 3c), what can be provided in an embodiment of the liquid container 1 is a projection 18 on a dimensionally stable container part, in this case the upper dimensionally stable container part 6, that, in the end position of the container parts 6, 7, projects into the space which is laterally delimited by the material of the delimitation means 9, in this case by the folds of the concertina bellows. Here, "laterally" means the direction transverse to the direction in which the container parts are moved relative to one another. The projection 18 is a projection 18 which, in the starting position, faces the shape-changeable delimitation means 9 and/or the accommodation volume 2 and which, in particular, is cohesively connected to the container part 6 or integral therewith. Thus, during the relative movement of the container parts 6, 7 to one another that causes the change in volume of the accommodation volume 2, the projection 18 penetrates into the remaining space (dead space) and displaces the liquid medium situated therein at least to a great extent and substantially completely.

Figure 5:
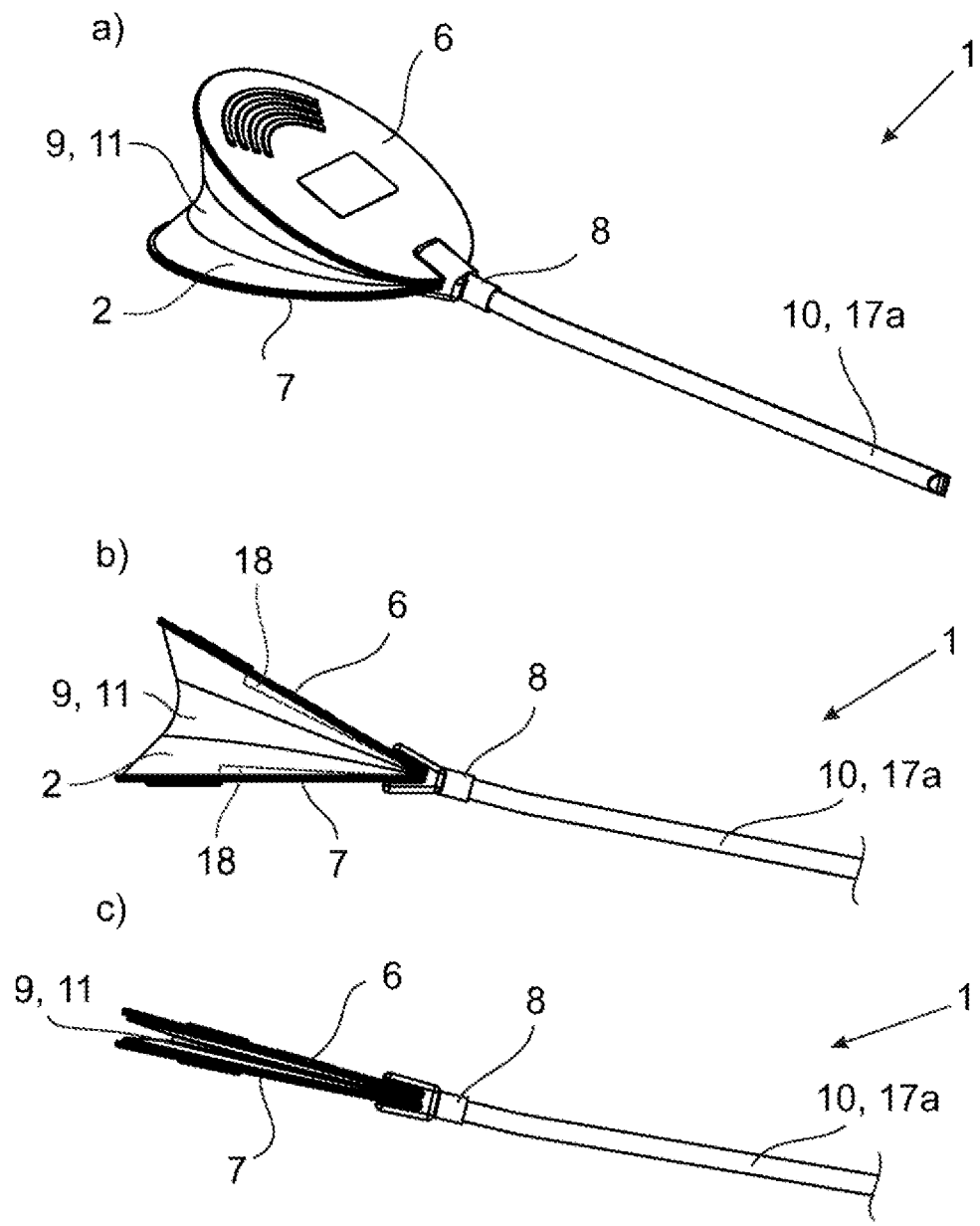
FIG. 5 shows a) a perspective view before use, b) a side view before use and b) a side view after use of a proposed liquid container according to a second exemplary embodiment.

In the case too of the exemplary embodiment in FIG. 5, the delimitation means 9 provided is a bellows 11, which is compressed by means of the container parts 6, 7 in order to discharge the liquid medium. Here however, said relative movement between the container parts 6, 7 does not compress the bellows 11 toward the outlet connection 8, but in a direction around the outlet connection 8. Thus, the bellows 11 is designed here together with the dimensionally stable container parts 6, 7 according to the principle of a pair of bellows; this means that the bellows 11 in the initial position is thicker on the side facing away from the outlet connection 8 than on the side facing the outlet connection 8 and the bellows 11 in the end position is substantially identical in thickness on both sides. In principle and specifically in the exemplary embodiment according to FIG. 5, it would however also be conceivable for the limiting means 9 provided to be merely a membrane which connects the container parts 6, 7 to one another in a sealed manner.

As schematically shown by FIG. 5*b*), what can also be provided here in an embodiment of the liquid container 1 is a projection 18 on at least one dimensionally stable container part, in this case both the upper and lower dimensionally stable container parts 6, 7, that, in the end position of the container parts 6, 7, projects into the space which is laterally delimited by the material of the delimitation means 9, in this case by the folds of the pair of bellows. Here too, "laterally" means the direction transverse to the direction in which the container parts are moved relative to one another. Here, said space is laterally delimited only on one side by the material of the delimitation means 9, in this case by the folds of the pair of bellows. The projection 18 is likewise respectively a projection 18 which, in the starting position, faces the shape-changeable delimitation means 9 and/or the accommodation volume 2 and which, in particular, is cohesively connected to the respective container part 6, 7 or integral therewith. Thus, here, during the relative movement of the container parts 6, 7 to one another that causes the change in volume of the accommodation volume 2, the two projections 18 penetrate into the remaining space (dead space) and displace the liquid medium situated therein at least to a great extent and substantially completely. It should be noted that, here too, only one projection 18 can be provided, which is then, for example, provided only on the container part 6.

Figure 6:
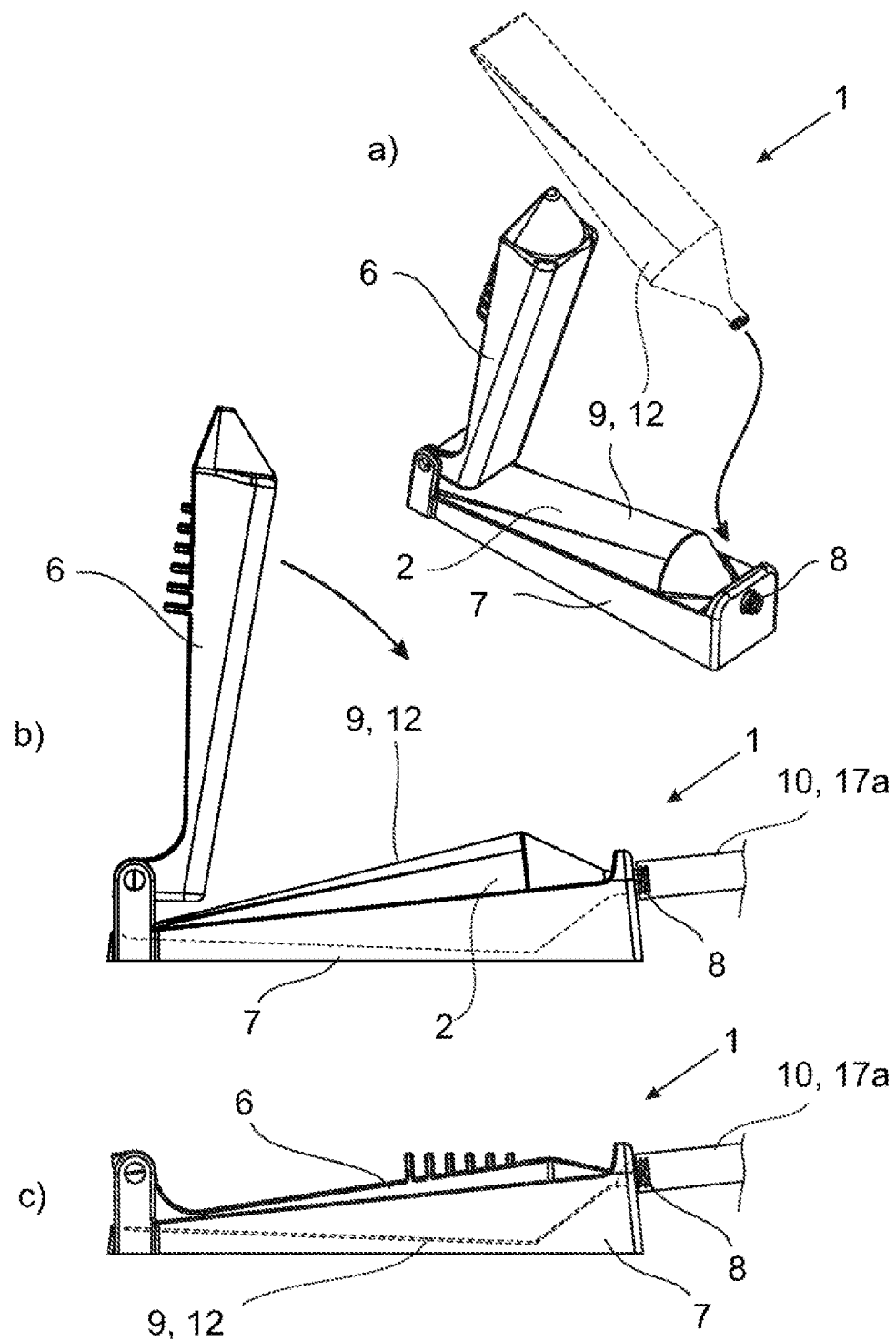
FIG. 6 shows a) a perspective view before use, b) a side view before use and b) a side view after use of a proposed liquid container according to a third exemplary embodiment.

In the case of the exemplary embodiment in FIG. 6, the delimitation means 9 is a tube 12 which, through the movement of the container parts 6, 7 relative to one another, is squeezed in order to discharge the liquid medium. Here too, the bellows 11 is, through said relative movement between the container parts 6, 7, not compressed toward the outlet connection 8, but in a direction around the outlet connection 8.

In principle, but not absolutely necessary in the present case, what can also be provided here in an embodiment of the liquid container 1 is a projection (not shown) on at least one dimensionally stable container part 6, 7 that, in the end position of the container parts 6, 7, projects into the space which is laterally limited by the material of the delimitation means 9.

In the exemplary embodiments, the delimitation means 9, i.e., here the bellows 11 or the tube 12, is respectively inserted in at least one of the dimensionally stable container parts 6, 7 and/or between both dimensionally stable container parts 6, 7 in a detachable manner, especially in a form-fitting manner. This facilitates the separate filling of the accommodation volume 2 or delimitation means 9 and the subsequent disposal thereof.

In principle, it is however also conceivable in an alternative embodiment, which is not depicted here, to connect the delimitation means 9 to at least one of the container parts 6, 7, or to both container parts 6, 7, in a permanent manner, i.e., in a manner such that detachment is no longer non-destructively possible, especially in a cohesive manner.

Figure 4:
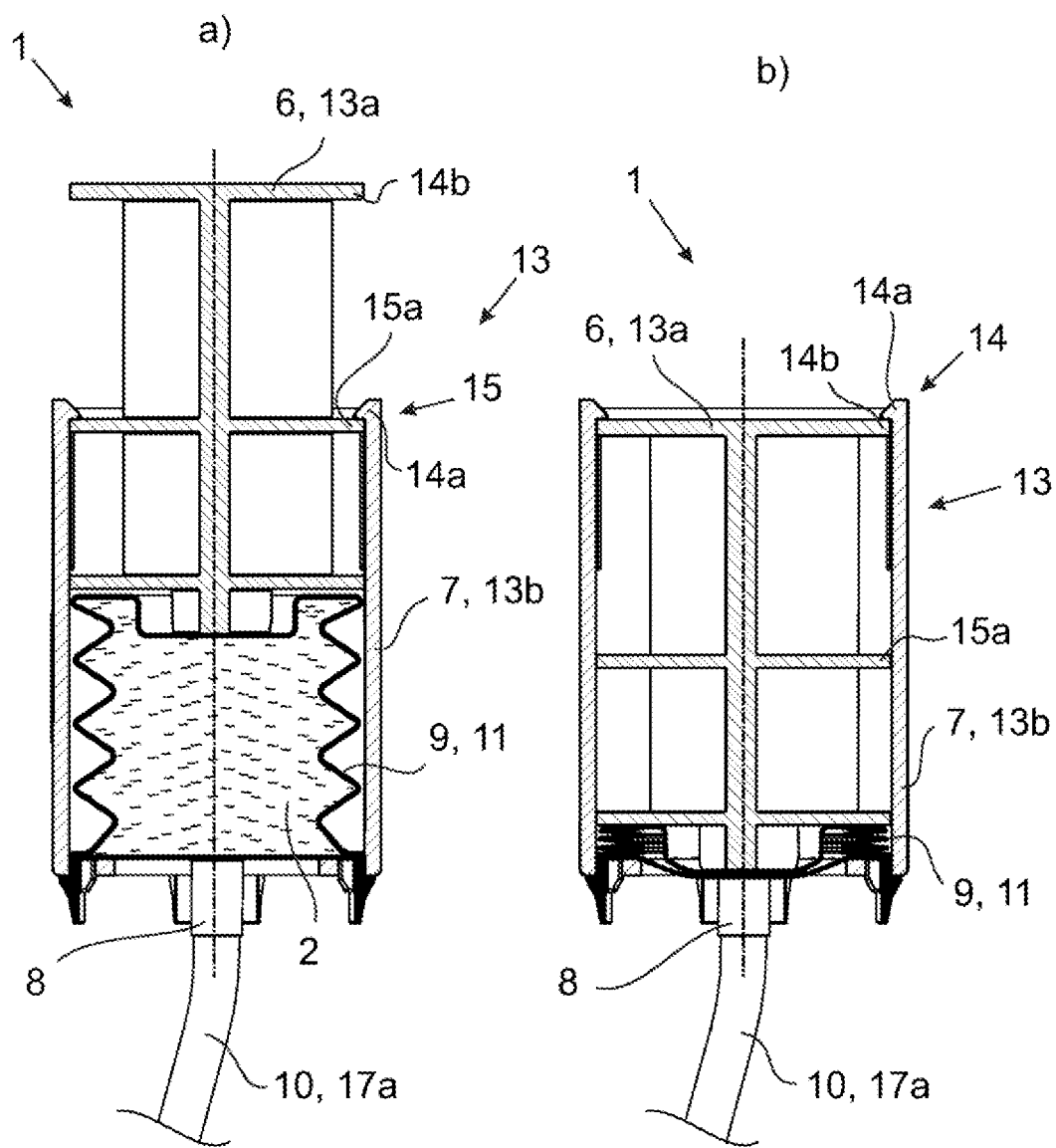
FIG. 4 shows a side view of the proposed liquid container according to FIG. 1 a) before use and b) after use.

In case of the first exemplary embodiment, as illustrated by FIG. 4, the two dimensionally stable container parts 6, 7 are movable toward one another in a linear manner. They form, here, a cylinder-piston arrangement 13, wherein the upper container part 6 in FIG. 4 forms a piston 13*a* and the lower container part 7 forms a cylinder 13*b* in which the piston 13*a* is movable in a linear manner. By contrast, in the case of the exemplary embodiments in FIGS. 5 and 6, the dimensionally stable container parts 6, 7 are pivotable relative to one another. In the case of the exemplary embodiment in FIG. 5, at least one of the dimensionally stable container parts 6, 7, or both in this case, is/are plate-shaped. "Plate-shaped" means that they have a substantially identical thickness over their entire extent and extend substantially along one plane. In the case of the exemplary embodiment in FIG. 6, at least one of the dimensionally stable container parts 6, 7 is pan-shaped. Here, "pan-shaped" means that the respective container part 6, 7 defines an accommodation space into which the delimitation means 9 can then be inserted, the tube 12 in the case of FIG. 6. In principle, the proposed liquid container 1, such as here in the case of the exemplary embodiments according to FIGS. 5 and 6, can be configured such that in any case the side of at least one of the container parts 6, 7, such as both container parts 6, 7, that faces the delimitation means 9 and/or the accommodation volume 2 is substantially flat in order to form an optimal contact surface for contact with the delimitation means 9.

For the proposed liquid container 1, it can be when, in the end position as depicted in FIGS. 4*b*), 5*c*) and 6*c*), one dimensionally stable container part 6 is held in a form-fitting manner on the other dimensionally stable container part 7 in the direction of the initial position. For this purpose, mention may be made, merely by way of example, of a catch mechanism, which is depicted here only for the exemplary embodiment according to FIG. 1, but can also be provided in the other exemplary embodiments.

Here, as shown by FIG. 4*b*) in particular, one of the container parts, in this case the lower container part 7, has one or more latching tabs 14*a* and the other container part, in this case the upper container part 6, has a counterpart 14*b* that interacts therewith in a latching manner. Now, if the dimensionally stable container parts 6, 7 are moved from the initial position (FIG. 4*a*) to the end position (FIG. 4*b*), the counterpart 14*b* is guided past the respective latching tab 14*a*, the result being that a latching connection 14 is then formed in the end position. Such a latching connection 14 has the advantage that, after the liquid medium has been dispensed, no medium can be sucked back into the accommodation volume 2 owing to possible elastic recovery of the delimitation means 9 in particular.

Furthermore, FIG. 4 depicts a securing element 15, here an axial securing element 15, which prevents the container parts 6, 7 from being able to detach from one another in the initial position. Here, this purpose is likewise served by the latching tabs 14*a*, which interact in a form-fitting manner with a further counterpart 15*a*.

Figure 3:
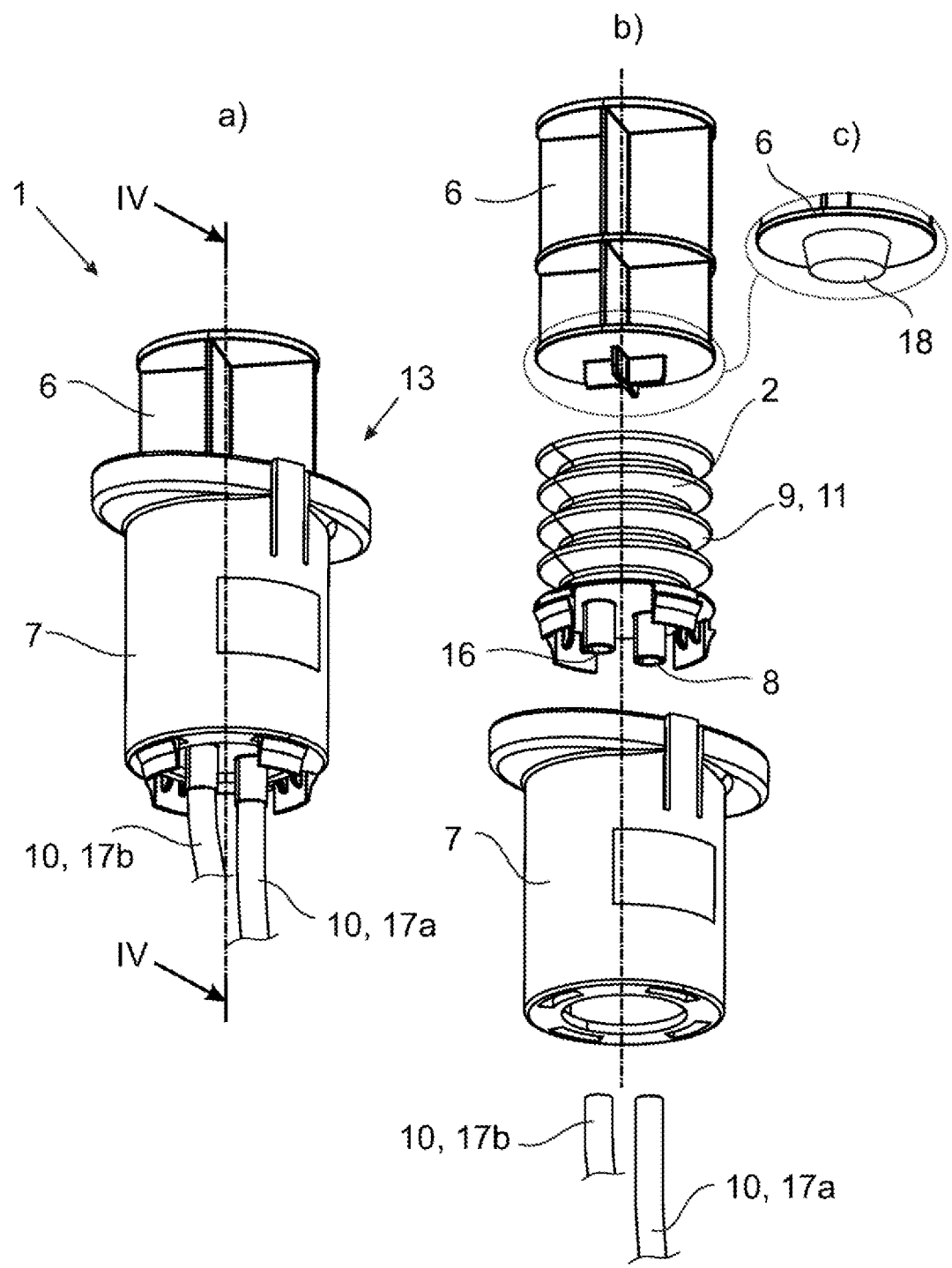
FIG. 3 shows a) a perspective view and b) an exploded view of the proposed liquid container according to FIG. 1, with c) showing a variant of b)

As shown by FIG. 3 furthermore, in the case of the first exemplary embodiment depicted here, the outlet connection 8 is formed on the delimitation means 9, in this case the bellows 11. Here, a filling connection 16 for, in particular, filling of the accommodation volume 2 with the liquid medium by the manufacturer is also additionally provided on the delimitation means 9 or bellows 11. In the case too of the exemplary embodiments in FIGS. 5 and 6, the outlet connection 8 is formed on the delimitation means 9. However, no additional filling connection is provided here.

Additionally or alternatively, an outlet connection 8 can also be provided on one of the dimensionally stable container parts 6, 7.

Here, a piece of tubing 17a, 17b or tube, which forms the extension 10 already mentioned, is coupled to the respective outlet connection 8 and, in the case of the first exemplary embodiment, also to the filling connection 16. Via the piece of tubing 17a, 17b or the tube, the liquid medium can then be discharged from the accommodation volume 2 or be introduced therein by the manufacturer. Here, the end of the hose 17a, 17b or tube that is respectively pointing away from the liquid container 1 is sealed, especially heat-sealed, by the manufacturer. To dispense the liquid medium, this seal is then removed beforehand, for example as part of the previously mentioned sterile welding process for fluidic connection of the respective piece of tubing 17a, 17b to a further piece of tubing (not depicted here) which can be on the system side or reactor side.

In a further embodiment, the piece of tubing 17a, 17b has already been connected to a coupling device of a sterile connector by the manufacturer, which coupling device can then be coupled in a sterile and fluidic manner to a corresponding coupling device connected to a piece of tubing on the system side or reactor side.

The accommodation volume 2 is, here, of such a size that, in the initial position, the quantity of liquid medium in the accommodation volume 2, here the maximum fill quantity, can be up to 50 ml, up to 40 ml, or up to 30 ml.

According to a further teaching which is of independent significance, the packaging arrangement 3, which is depicted by way of example in FIG. 2, comprising the package 4 and the proposed liquid container 1 sterile-packed therein is provided as such. As mentioned, it can be here when the packaging arrangement 3 contains the liquid container 1 in the already filled state. In this respect, reference may be made to all the statements concerning the proposed liquid container 1.

Here, packed in the package 4 is not only the container parts 6, 7 and the delimitation means 9, especially the bellows 11, but also the extension(s) 10 in the form of the respective piece of tubing 17a, 17b or tube. In an alternative embodiment not depicted here, it is also conceivable that the proposed packaging arrangement 3 comprises, sterile-packed in the package 4, only the delimitation means 9, which can be prefilled, optionally with the extension(s) 10 or the respective piece of tubing 17a, 17b or tube. The dimensionally stable container parts 6, 7 can in this case be sterile-packed in a separate package or provided by the end user.

According to yet another teaching which is likewise of independent significance, the use of a proposed sterile-packed liquid container 1 and/or a proposed packaging arrangement 3 for the addition of a liquid medium into a bioprocessing system, especially into a bioreactor, is provided as such. With respect to the use, too, reference may be made to all the statements concerning the proposed liquid container 1 and the proposed packaging arrangement 3.

After the liquid container 1 has been unpacked from the package 4, it is connected to the respective bioprocessing system, in this case via one of the extensions 10 or via the hose 17a or the tube.

In some embodiments, at least the delimitation means 9, also at least one of the dimensionally stable container parts 6, 7, especially both dimensionally stable container parts 6, 7, and/or the piece(s) of tubing 17a, 17b or tube(s) is/are a single-use component in each case. The respective component, i.e., the delimitation means 9, the respective dimensionally stable container part 6, 7 and/or the respective piece of tubing 17a, 17b or the respective tube, is at least partially, or at least predominantly, made of a plastics material. The delimitation means 9 can be formed from a plastics film. A silicone material and/or a polymer material are particularly suitable as plastics for the individual components. Examples thereof are PE (polyethylene), PP (polypropylene), PTFE (polytetrafluoroethylene), PBT (polybutylene terephthalate), PSU (polysulfone), PESU (polyethersulfone) and PC (polycarbonate).

The invention claimed is:

1. A small-volume liquid container for dispensing a liquid medium into a bioprocessing system, comprising: an accommodation volume for the liquid medium, wherein the liquid container comprises two dimensionally stable container parts, which are movable relative to one another between an initial position and an end position, and an outlet connection for discharge of the liquid medium, wherein the liquid container comprises a shape-changeable delimitation element which at least sectionally delimits the accommodation volume and which is connected to the dimensionally stable container parts in such a way that a relative movement of the dimensionally stable container parts to one another, causing a change in volume of the accommodation volume, is associated with a change in shape of the delimitation element, wherein the delimitation element is arranged or is arrangeable between the dimensionally stable container parts, wherein a filling connection for filling of the accommodation volume with the liquid medium is provided on the delimitation element, wherein the outlet connection is provided on the delimitation element, and wherein both, the outlet connection and the filling connection are arranged axially at an end of the delimitation element, wherein both, the outlet connection and the filling connection are oriented parallel to each other and in axial direction of a center axis of the liquid container, and wherein the outlet connection and the filling connection are offset from the center axis of the liquid container, wherein one of the dimensionally stable container parts defines a single opening, wherein the outlet connection and the filling connection pass through the single opening.

2. The liquid container as claimed in claim 1, wherein the delimitation element substantially delimits the accommodation volume by itself or in that the delimitation element at least substantially delimits the accommodation volume together with at least one of the dimensionally stable container parts.

3. The liquid container as claimed in claim 1, wherein the delimitation element is a bellows, a tube or a membrane.

4. The liquid container as claimed in claim 1, wherein the delimitation element is inserted in at least one of the dimensionally stable container parts and/or between both dimensionally stable container parts in a detachable manner, or wherein the delimitation element is connected to at least one of the dimensionally stable container parts in a permanent manner.

5. The liquid container as claimed in claim 1, wherein the dimensionally stable container parts are movable toward one another in a linear manner.

6. The liquid container as claimed in claim 1, wherein, in the end position, one dimensionally stable container part is held in a form-fitting manner on the other dimensionally stable container part in the direction of the initial position.

7. The liquid container as claimed in claim 1, wherein a piece of tubing or tube is coupled to the outlet connection and/or a piece of tubing or tube is coupled to the filling connection, wherein an end of the piece of tubing or tube that is pointing away from the liquid container is sealed.

8. The liquid container as claimed in claim 1, wherein the accommodation volume is filled with a liquid medium, wherein the amount of the liquid medium in the accommodation volume is up to 50 ml.

9. The liquid container as claimed in claim 1, wherein one of the dimensionally stable container parts or both dimensionally stable container parts have in each case a projection which, in the end position after the relative movement of the dimensionally stable container parts to one another that causes the change in volume of the accommodation volume, projects into a space which is laterally delimited by the material of the delimitation element.

10. A packaging arrangement comprising a package and a liquid container as claimed in claim 1 sterile-packed therein.

11. The liquid container as claimed in claim 1, wherein the delimitation element substantially delimits the accommodation volume by itself or in that the delimitation element at least substantially delimits the accommodation volume together with both dimensionally stable container parts.

12. The liquid container as claimed in claim 1, wherein the delimitation element is inserted in between both dimensionally stable container parts in a detachable manner, or wherein the delimitation element is connected to both dimensionally stable container parts, in a permanent manner.

13. The liquid container as claimed in claim 1, wherein the dimensionally stable container parts are movable toward one another in a linear manner, wherein the dimensionally stable container parts form a cylinder-piston arrangement.

* * * * *